(12) United States Patent
Doucet et al.

(10) Patent No.: US 6,985,239 B2
(45) Date of Patent: Jan. 10, 2006

(54) POSITION-SENSING DEVICE FOR 3-D PROFILOMETERS

(75) Inventors: Michel Doucet, Saint-Augustin-de-Desmaures (CA); Denis Boulanger, Sainte-Foy (CA); John Laurent, Saint-Augustin-de-Desmaures (CA)

(73) Assignee: Institut National d'Optique, Sante-Foy (CA)

( * ) Notice: Subject to any disclaimer, the term of this patent is extended or adjusted under 35 U.S.C. 154(b) by 234 days.

(21) Appl. No.: 10/403,306

(22) Filed: Mar. 31, 2003

(65) Prior Publication Data

US 2004/0190005 A1 Sep. 30, 2004

(51) Int. Cl.
*G01B 11/24* (2006.01)
(52) U.S. Cl. .............. 356/608; 356/623; 250/559.23; 250/214 PR
(58) Field of Classification Search ........... 356/602, 356/608, 614–617, 622–623; 250/559.23, 250/559.31, 214 PR
See application file for complete search history.

(56) References Cited

U.S. PATENT DOCUMENTS

| | | | | | |
|---|---|---|---|---|---|
| 4,355,904 A | * | 10/1982 | Balasubramanian | ........ | 356/608 |
| 4,677,302 A | * | 6/1987 | Chiu et al. | ............. | 250/559.22 |
| 4,796,997 A | * | 1/1989 | Svetkoff et al. | ............. | 356/608 |
| 4,850,712 A | * | 7/1989 | Abshire | ..................... | 356/602 |

* cited by examiner

*Primary Examiner*—Richard A. Rosenberger
(74) *Attorney, Agent, or Firm*—Wallenstein Wagner & Rockey, Ltd.

(57) ABSTRACT

An apparatus for sensing position data of a light pattern created by a known light source on an object, comprising an optical system for collecting an incident light beam of the light pattern and transmitting the incident light beam to a beam splitter. The beam splitter has a known reflection/transmission ratio, such that the incident light beam from the light pattern received on the surface of the beam splitter results in a transmission channel, transmitted through the beam splitter, and a reflective channel, reflected from the beam splitter, with intensities of the transmission channel and the reflective channel varying as a function of a position of the incident light beam on the surface of the beam splitter. Detectors detect the intensities of the reflective channel and of the transmission channels. Dimensions of points of the light pattern on the object are calculable as a function of the intensity of the reflective channel and of the intensity of the transmission channel.

14 Claims, 6 Drawing Sheets

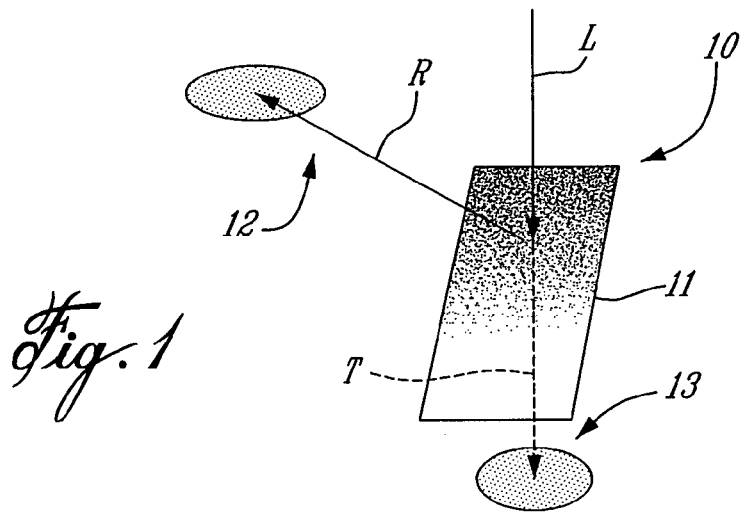
Fig. 1
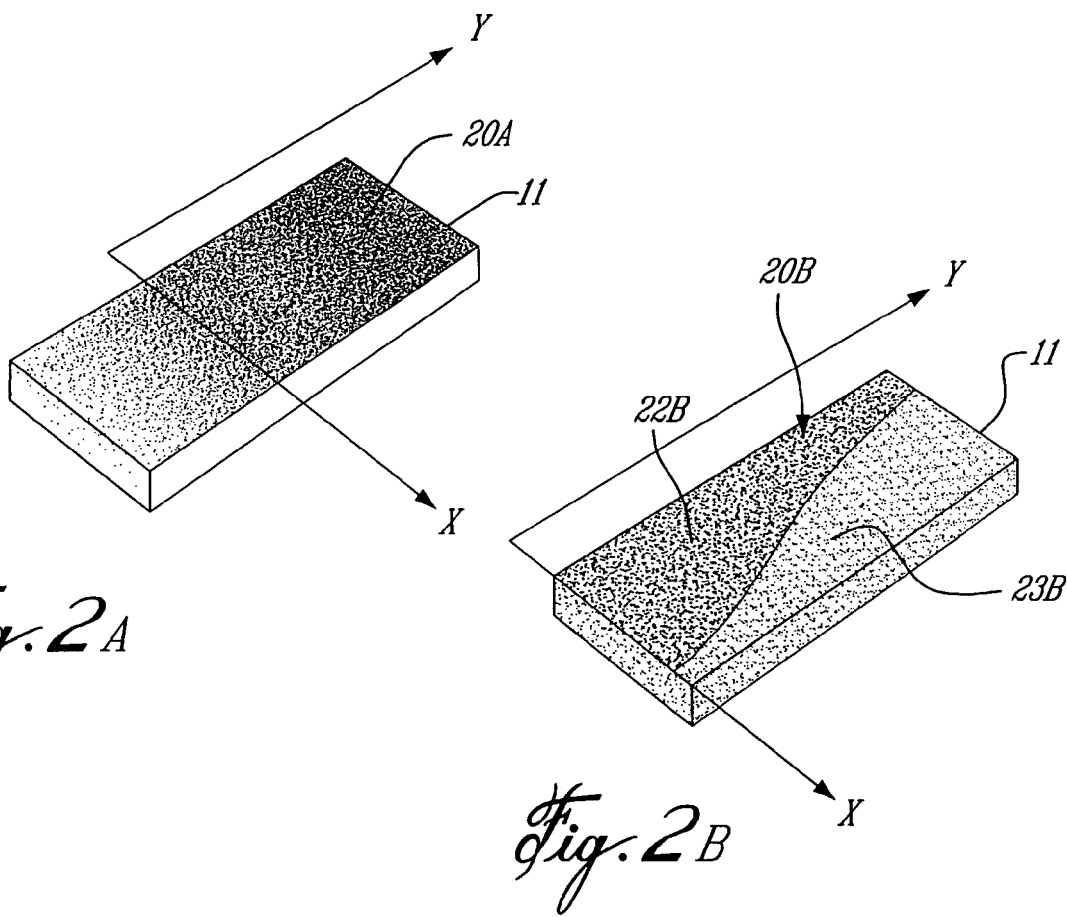
Fig. 2A
Fig. 2B

POSITION-SENSING DEVICE FOR 3-D PROFILOMETERS

BACKGROUND OF THE INVENTION

1. Field of the Invention

The present invention relates to position data acquisition and, more particularly, to a device and method to be used as part of position-sensing apparatuses.

2. Description of the Prior Art

In the field of information sensing, machine vision technologies provide valuable information about the environment and about specific objects of interest through close inspection. Known 3-D data acquisition systems have been provided using 3-D sensors based on the active triangulation principle. In such systems, a specific known and fixed pattern of illumination (i.e., structured illumination) is projected from a light source (e.g., laser) on an object to be measured, and the intersection of that emitted pattern is observed from a known and fixed oblique angle by a digital camera, having photodetection means such as a charged coupled device (CCD) array, whereby the position of the illuminated points on the object translate to positions on the camera array, such that the position of the illuminated points on the object can be computed trigonometrically.

Triangulation uses a functional relation carried out by the imaging system between the position of the luminous spot on the observed surface and the position of the image of this spot measured by the CCD array. Due to this functional relation, the determination of the image position allows the unambiguous determination of the position in the 3-D space of the surface portion intercepted by the illumination beam.

For instance, one of these systems is referred to as a laser profilometer, wherein a laser is used as the light source for illumination. Such profilometers analyze deformations of a laser line on an object to evaluate, for instance, the depth (Z-axis) as well as the horizontal position (X-axis) of the object. Generally, the translation of either one of the profilometer and the object to be scanned by way of a translation mechanism allows the missing vertical position (Y-axis) to be obtained by knowing the rate of displacement between the object and the profilometer. The points of the emitted pattern observed by the digital camera are positioned with respect to the digital camera by calculations involving the focal length, the position of the transmitted light pattern on the CCD array, the distance and angle between the digital camera and the laser Among the design limitations affecting the speed of off-the-shelf profilometers are the acquisition speed, in images per second, of the digital camera, and the processing capacity of the data processing system in extracting the laser profile and computing the positions thereof, considering the four above-mentioned values required for carrying out the calculations of the positions. Because of these limitations, the off-the-shelf profilometers perform maximum acquisition speeds ranging between 1,000 and 2,000 profiles per second.

SUMMARY OF THE INVENTION

It is an aim of the present invention to provide a novel method of sensing position information.

It is a further aim of the present invention to provide a position-sensing device having a faster data acquisition speed.

It is a still further aim of the present invention to provide a 3-D position data acquisition apparatus with the above-mentioned position-sensing device Therefore, in accordance with the present invention, there is provided a device for sensing position data of a light pattern created by a known light source on an object, comprising a beam splitter having a surface of a known reflection/transmission ratio, such that an incident light beam from the light pattern received on the surface of the beam splitter results in at least one of a transmission channel, transmitted through the beam splitter, and a reflective channel, reflected from the beam splitter, with intensities of the transmission channel and the reflective channel varying as a function of a position of the incident light beam on the surface of the beam splitter; a first photodetector section adapted to detect the intensity of the reflective channel; and a second photodetector section adapted to detect the intensity of the transmission channel; wherein at least a first dimension of at least one point of the light pattern on the object is calculable as a function of the intensity of the reflective channel and of the intensity of the transmission channel.

Further in accordance with the present invention, there is provided an apparatus for sensing position data of a light pattern created by a known light source on an object, comprising an optical system for collecting an incident light beam of the light pattern and transmitting the incident light beam to a beam splitter; the beam splitter having a surface of a known reflection/transmission ratio, such that the incident light beam from the light pattern received on the surface of the beam splitter results in at least one of a transmission channel, transmitted through the beam splitter, and a reflective channel, reflected from the beam splitter, with intensities of the transmission channel and the reflective channel varying as a function of a position of the incident light beam on the surface of the beam splitter; a first detector section adapted to detect the intensity of the reflective channel; and a second detector section adapted to detect the intensity of the transmission channel; wherein at least a first dimension of at least one point of the light pattern on the object is calculable as a function of the intensity of the reflective channel and of the intensity of the transmission channel.

Still further in accordance with the present invention, there is provided a method for sensing position data of a light pattern created by a known light source on an object, comprising the steps of: i) providing a beam splitter having a surface with a known reflection/transmission ratio; ii) projecting an incident light beam from the light pattern on the beam splitter, such that the incident light beam becomes at least one of a reflective channel and a transmission channel with intensities of the reflective channel and the transmission channel varying as a function of the position of the incident light beam on the surface of the beam splitter; and iii) calculating at least a dimension of at least one point of the light pattern on the object as a function of the intensity of the reflective channel and of the intensity of the transmission channel.

BRIEF DESCRIPTION OF THE DRAWINGS

Having thus generally described the nature of the invention, reference will now be made to the accompanying drawings, showing by way of illustration a preferred embodiment thereof and in which:

FIG. 1 is a schematic view of a position-sensing device in accordance with the present invention;

FIG. 2A is a perspective view of a beam splitter having a first surface pattern in accordance with the present invention;

FIG. 2B is the beam splitter having a second surface pattern in accordance with the present invention;

DESCRIPTION OF THE PREFERRED EMBODIMENTS

Figure 3:
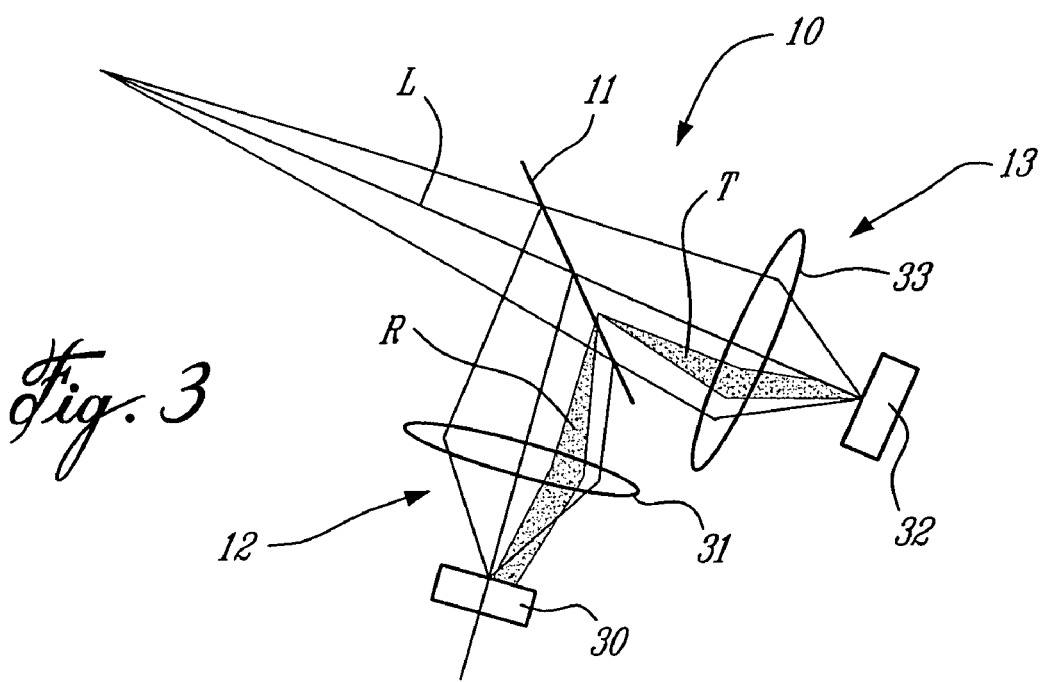
FIG. 3 is a perspective view of the position-sensing device.

Referring to the drawings, and more particularly to FIG. 1, a position-sensing device in accordance with the present invention is generally shown at 10. The position-sensing device 10 has a beam splitter 11, a reflective photodetector section 12 and a transmission photodetector section 13. The position-sensing device 10 can be used as part of position-sensing apparatuses for obtaining 3-D profiles of objects. However, in a basic embodiment of the position-sensing device 10, the latter will be used to determine the distance separating it from points on an object. A light beam L being reflected from the object is received by the position-sensing device 10 More precisely, the light beam L from the surface of the object projects a spot of light on a surface of the beam splitter 11. A portion of the light beam L is reflected, whereby the beam will be referred to as "reflective channel R." A remaining portion of the light beam L is transmitted through the beam splitter 11, whereby the light beam will be referred to as "transmission channel T." The reflective channel R will be reflected onto the reflective photodetector section 12, whereby a reflective energy value $I_R$ is obtained. Similarly, the transmission channel T is transmitted to the transmission photodetector section 13, whereby a transmission energy value $I_T$ will be obtained.

Accordingly, an input value C, $$C = \frac{I_T - I_R}{I_T + I_R},$$

can be calculated. With this input value C, a distance Z between the spot of light on the object and the position-sensing device 10 is obtained by calibrated lookup tables defining the functional relation between the position on the beam splitter 11 of the light beam L and the input value C. In this formula, the numerator depends on the position of the incident light beam L, and a pattern on the surface of the beam splitter 11 giving a specific reflection/transmission ratio, as will be discussed in further detail hereinafter, while the denominator is a measure of the total amount of energy reflected towards the position-sensing device 10. The denominator is a normalizing factor that compensates for variations of intensity of the incident light beam L. Therefore, the calculation required to get the distance Z of the laser point on the surface of the object is simpler and more rapidly effected than the traditional method of seeking the maximal intensity points on a CCD array to gather images of profiles, as done in triangulation.

Referring to FIGS. 2A and 2B, the beam splitter 11 is shown having two different surface patterns, namely surface patterns 20A and 20B, respectively. There are a plurality of ways to implement the beam splitter 11. The surface pattern 20A of FIG. 2A is a variable reflectivity mirror, with a nearly null reflectivity at one end and a reflectance value growing linearly along a dimension of the beam splitter 11 to reach nearly 100% at the other end. Therefore, the beam splitter 11 having the surface pattern 20A is manufactured in such a way so as to obtain a variation of the reflectivity along an axis Y thereof, whereas there is no variation of the reflectivity along the axis X thereof. The surface pattern 20A is preferably a metallic deposition (often chrome) on a transparent thin plate, so as not to absorb light, such that the unreflected portion of the light is transmitted through the beam splitter 11, i.e., results in the transmission channel T. The axis Y used to implement the positional reflectivity variations can be chosen to vary linearly, or ideally an optimal profile can be calculated according to the geometry and the desired operating range of the position-sensing device 10. The beam splitter 11 can also have a pattern that varies nonlinearly, with the lookup tables calibrated to compensate for this effect, to allow the position-sensing device 10 to achieve a more linear sensitivity, resolution and accuracy over its entire operating range.

The surface pattern 20B of the beam splitter of FIG. 2B displays a binary metallic deposition mask. The surface of the mask is divided into two parts, a first part 22B being reflective, while a second part 23B is transmissive. A method of use of the position-sensing device 10 using the surface pattern 20B of the beam splitter 11 will be described hereinafter. As with the surface pattern 20A, the surface pattern 20B of the binary mirror can be chosen to vary linearly, or an optimal profile can be calculated according to the geometry and the desired operating range of the position-sensing device 10. Therefore, a beam splitter having a binary pattern such as the surface pattern 20B, can be designed to compensate for the nonlinear effect of the position-sensing device geometry using a varying slope or curve in order to achieve a more constant and linear sensitivity, resolution and accuracy over its entire operating range. The surface pattern 20A is preferably used when the light beam L results in a single point on the beam splitter 11 in the embodiment of FIGS. 1 to 4, whereas the binary pattern 20B is preferably used with a stretched light pattern on the beam splitter 11, as will be described hereinafter.

Referring to FIG. 3, the position-sensing device 10 is illustrated in further detail. The reflective photodetector section 12 is shown consisting of a photodetector 30 and a collecting lens 31 (or group of lenses), whereas the transmission photodetector section 13 has a photodetector 32 and a collecting lens 33. The light transmitted by the beam splitter 11, i.e., the transmission channel T, is collected on the photodetector 32 by means of the collecting lens 33 (or group of lenses). The reflected light, i.e., the reflective channel R, is simultaneously collected on the photodetector 30 via the collecting lens 31. The collecting lenses 31 and 33 will ensure that the channels R and T, respectively, will always be collected on the photodetectors 30 and 32, respectively. Therefore, the photodetectors 30 and 32 can be single-element photodetectors. The collecting lenses 31 and 33 form an image of an objective's pupil (not shown) on the center of the active surfaces of the photodetectors 30 and 32, respectively, whereby $I_R$ and $I_T$ are obtained. The fact that the photodetectors 30 and 32 are single-element photodetectors and that the collecting lenses 31 and 33 focus the light channels R and T, respectively, to the centers of their respective photodetectors enables problems related to the position dependence of the photodetectors' response to be avoided. Obviously, this is not necessary if the photodetectors have a uniform response throughout their active area. It is necessary that the collective lenses 31 and 33 be free of vignetting.

Figure 4:
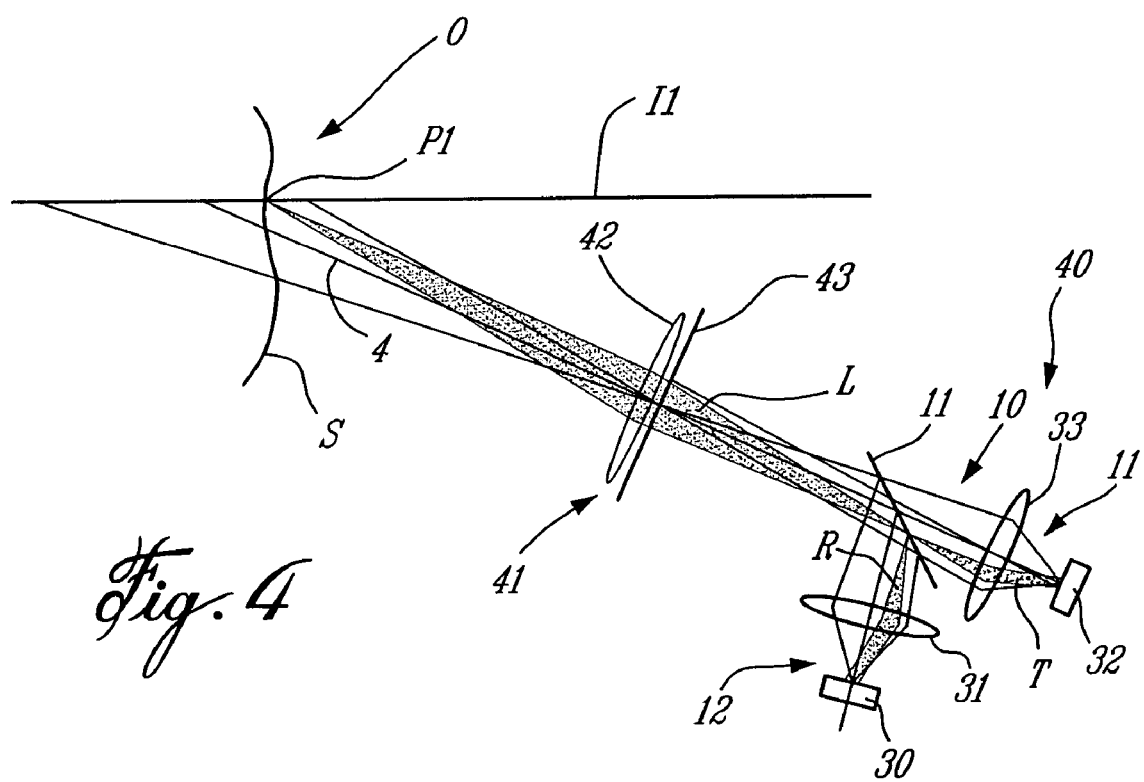
FIG. 4 is a perspective view of a position-sensing apparatus in accordance with the present invention.

Referring to FIG. 4, the position-sensing device 10 is shown in use, and is combined with an optical system 41 to form a single-point position-sensing apparatus that will capture a spot of light P1 on a surface S of an object O. The spot of light P1 is produced by a light source (not shown) such as a laser, projecting an illumination beam I1 on the surface S. In FIG. 4, the illumination beam I1 is collimated to create the spot of light P1. The optical system 41 consists, in FIG. 4, of an objective 42 and of a stop 43. The optical system 41 produces an image (light beam L) of the spot of light P1 on the beam splitter 11, which has the surface pattern 20A, and this image is divided in the reflective channel R and the transmission channel T to the reflective photodetector section 12 and the transmission photodetector section 13, respectively. In FIG. 4, the reflective channel R is transmitted by the collecting lens 31 to the photodetector 30, whereas the transmission channel T is transmitted by the collecting lens 33 to the photodetector 32.

The locations where the spot of light P1 can be seen by the position-sensing device 10 are necessarily along the illumination beam I1, whereby an optical axis A of the position-sensing device 10 makes a non-null angle with the illumination beam. This implies that the images of the spots of light P1 can arrive only on a portion of a line located on a tilted plane. The position and angle of this inclined plane are governed by the Scheimpflug condition.

Figure 5:
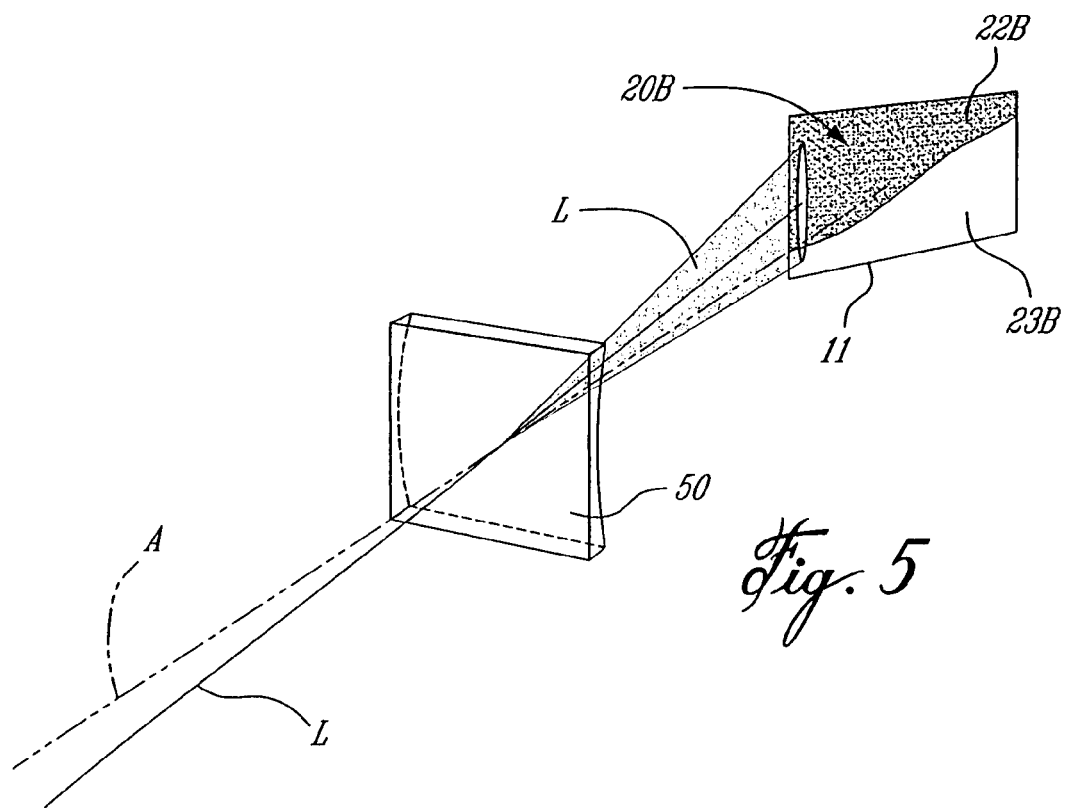
FIG. 5 is a perspective view of the beam splitter having the surface pattern of FIG. 2B during use.
Figure 6:
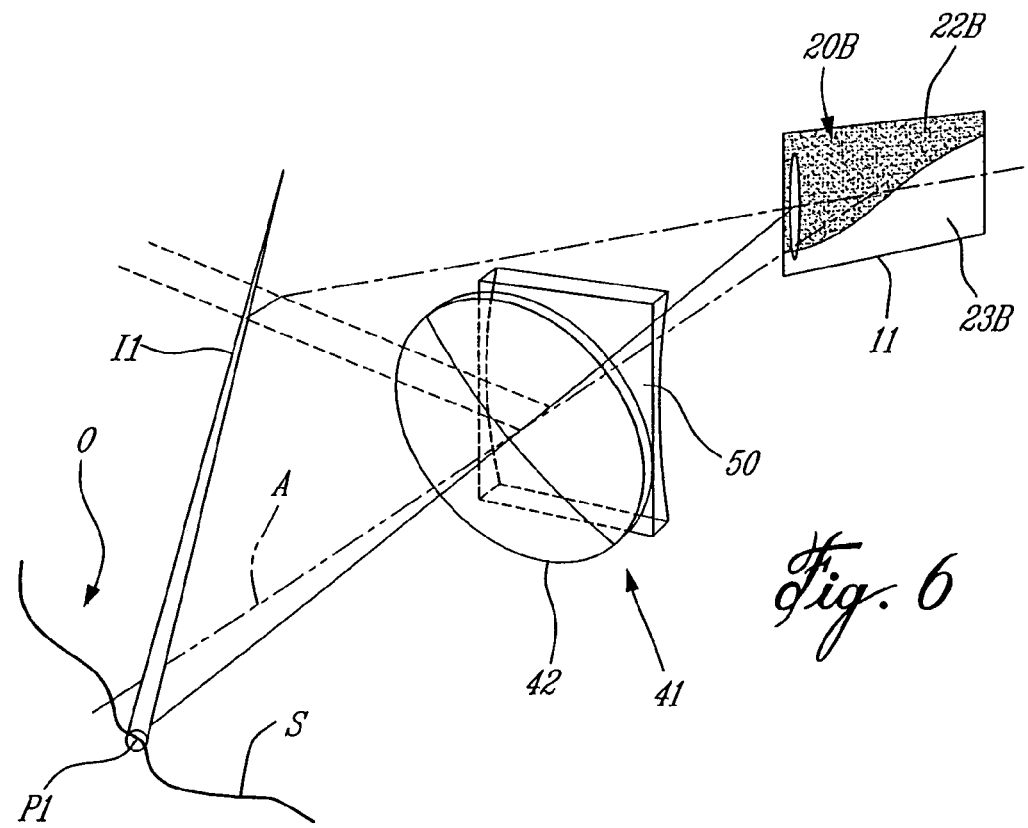
FIG. 6 is a perspective view of the beam splitter of FIG. 5 combined with an optical system during use.

Referring to FIGS. 5 and 6, the beam splitter 11 having the surface pattern 20B is shown receiving the light beam L thereon. The light spot collected on the surface pattern 20B is stretched in the direction perpendicular to the plane containing both the objective optical axis A and the illumination beam I1 (FIG. 6), whereby the light spot is partly received on both the reflective part 22B and the transmissive part 23B. This elongated shape of the light spot can be realized by providing the optical system 41 with a cylindrical lens 50 or by using a diffraction grating (not shown) that reproduces many partly overlapping replicas of the spot of light P1. As shown in FIGS. 5 and 6, the elongated spot is projected at different locations along a lateral axis of the binary mask (i.e., the surface pattern 20B). As the boundary between the reflective part 22B and the transmissive part 23B is at an angle with respect to the longitudinal dimension of the light spot, the ratio of reflection/transmission of the light beam L will depend on the position of the light spot on the beam splitter 11. The S-shaped form of the boundary between the reflective and transmissive parts 22B and 23B, respectively, is therefore used to linearize a functional relation between the Z distance along the illumination beam I1 and the calculated C value described previously.

Figure 7:
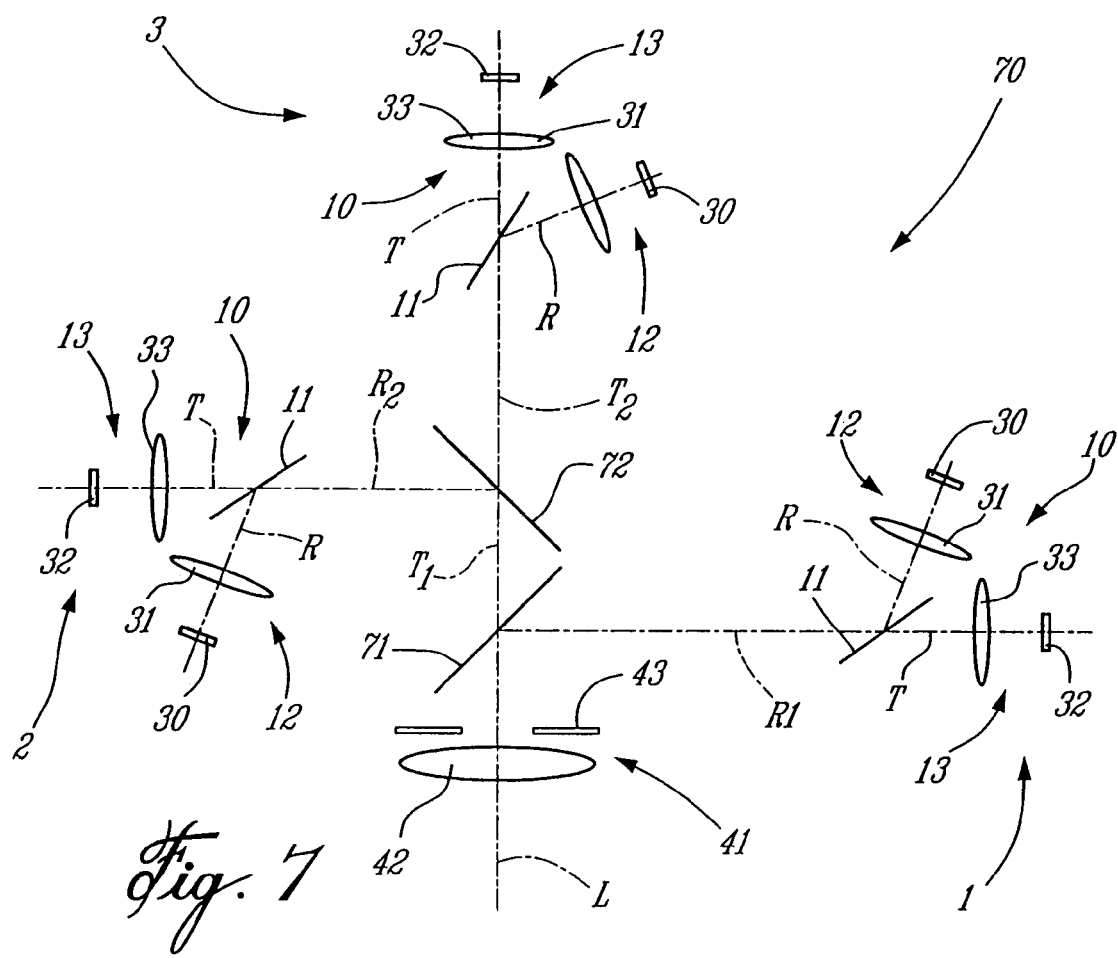
FIG. 7 is a top plan view of a multistage position-sensing apparatus in accordance with the present invention.

Referring to FIG. 7, a multistage position-sensing apparatus is generally shown at 70. The multistage position-sensing apparatus 70 has three position-sensing devices 10, as described for FIGS. 1 to 4, as well as the optical system 41, and beam splitters 71 and 72. The multistage configuration enhances the positional resolving power of position-sensing apparatuses. The position-sensing devices 10 make up three similar arms 1, 2 and 3 of the position-sensing apparatus 70. The initial input light beam L is transmitted through the optical system 41 and then split into three identical parts by the two beam splitters 71 and 72, which are partially reflective mirrors. The first beam splitter 71 reflects a third R1 of the light beam L and transmits the rest, i.e., T1. The second beam splitter 72 is a 50/50 partially reflective mirror, which reflects half of the light at R2 and transmits the other half at T2. Using these two beam splitters, each of the three arms formed by the position-sensing devices 10 receives approximately one third of the initial light energy.

Figures 8A, 8B, 8C:
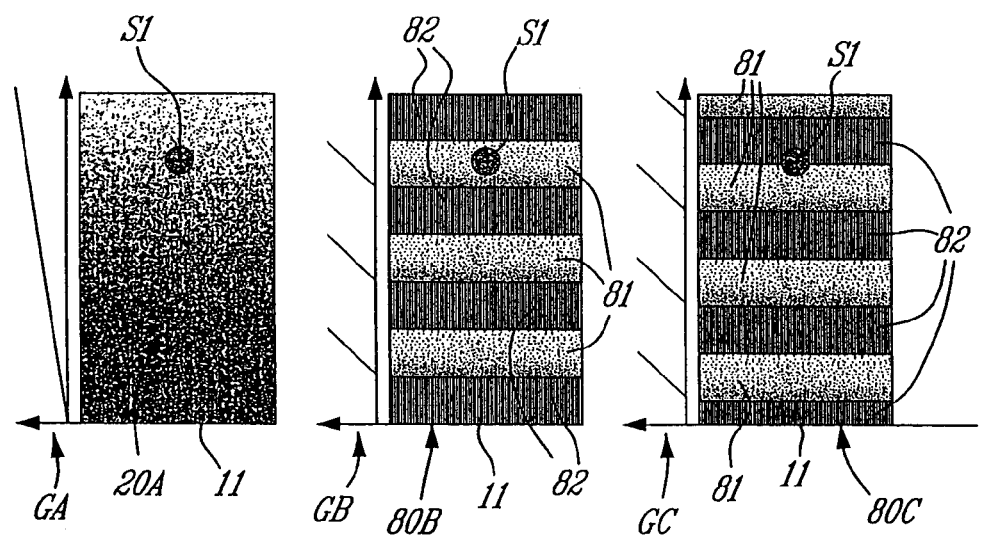
FIG. 8A is the beam splitter having the surface pattern of FIG. 2A.
FIG. 8B is the beam splitter having a mosaic surface of elementary cells for the multistage position-sensing apparatus.
FIG. 8C is the beam splitter having a mosaic surface of elementary cells shifted by a half-period with respect to the surface pattern of FIG. 8B.

In such a configuration, the three arms appear to be superimposed to an observer looking through the objective 42 of the optical system 41. Consequently, for a given spot of light at the input, the optical system 41 produces an image at the same location on each of the three beam splitters 11. The three arms of the position-sensing devices 10 are identical except for the surface patterns of reflectivity of their respective beam splitters 11. FIGS. 8A to 8C show the three proposed surface patterns laid out side by side. The surface pattern of FIG. 8A is essentially the surface pattern 20A illustrated in FIG. 2A, with a linearly increasing reflectivity, as shown by graph GA. The surface pattern 80B illustrated in FIG. 8B is essentially a mosaic using a linearly increasing reflectivity pattern as one of the two elementary cells it has, and is illustrated at 81 and shown by graph GB. The other one of the elementary cells, illustrated at 82, is opaque. The surface pattern 80C is identical to the second pattern 80B, except for a shift of half a period in the elementary cells, as shown by graph GC. For each of the position-sensing devices 10, the resolution is limited by the response of the two single-element photodetectors 30 and 32 it has. The arm 1 gives a coarse value of the position. One of the two other arms 2 and 3 gives a fine value of the position but with an uncertainty onto which of the elementary cells, i.e., cell 81 or cell 82, is illuminated. As shown in FIG. 8C, a spot of light S1 arrives at the boundaries of two adjacent elementary cells 81 and 82 on the surface pattern 80C. Since the spot S1 has a finite size, it illuminates the two adjacent elementary cells 81 and 82. In this situation, the value given by the arm 3 is largely distorted. On the other hand, as shown in FIG. 8B, the spot S1 completely illuminates a single one of the elementary cells 81 of the surface pattern 80B. This corresponds to an ideal situation since the photoelectric detectors 30 and 32 of the transmission channel T and reflection channel R receive about the same quantity of light, and this gives the most precise measurement. Consequently, one of the two arms 2 and 3 gives a precise measurement inside an unspecified elementary cell 81. This elementary cell 81 can be correctly identified using the result given by the arm 1. The gain in positioning accuracy obtained by using such a three-arm detection device is thus equal to the accuracy obtained using the beam splitter 11 having the surface pattern 20A multiplied by the number of elementary cell patterns that can be used in the mosaics of the surface patterns 80B and 80C. It is obvious that other arms (nor shown) can be added to the multistage position-sensing apparatus 70, to further enhance the accuracy thereof.

Figure 9:
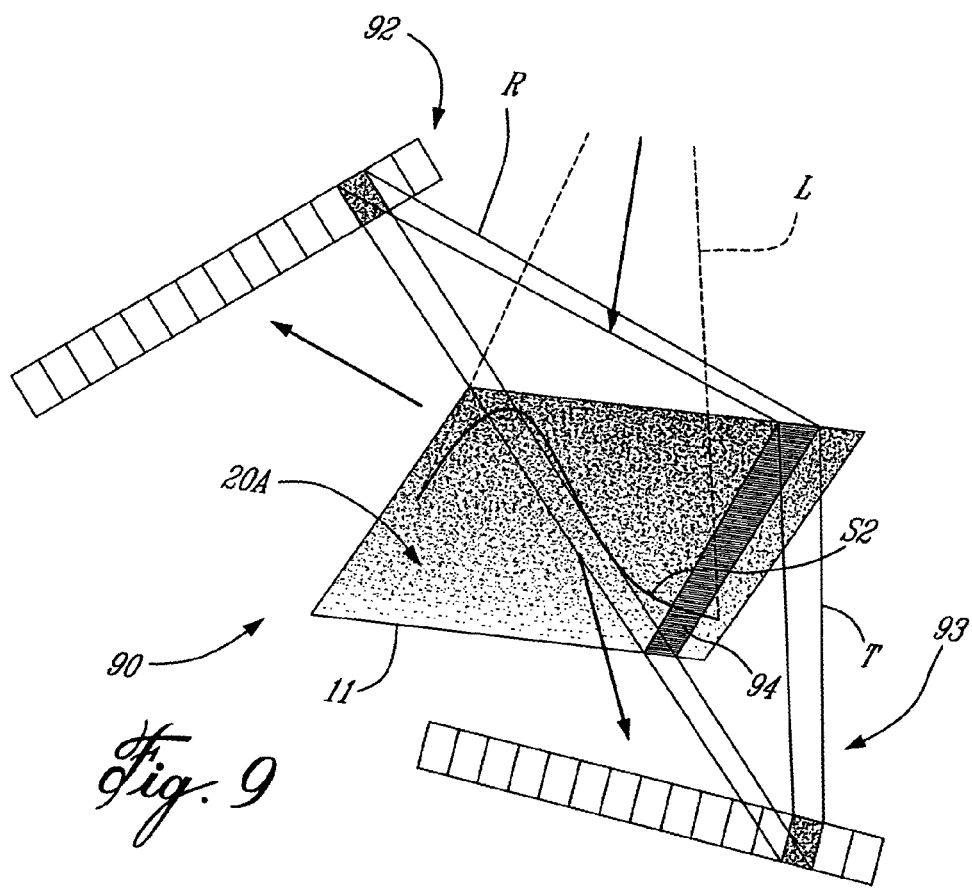
FIG. 9 is a schematic view of a multipoint position-sensing device in accordance with the present invention.
Figure 10:
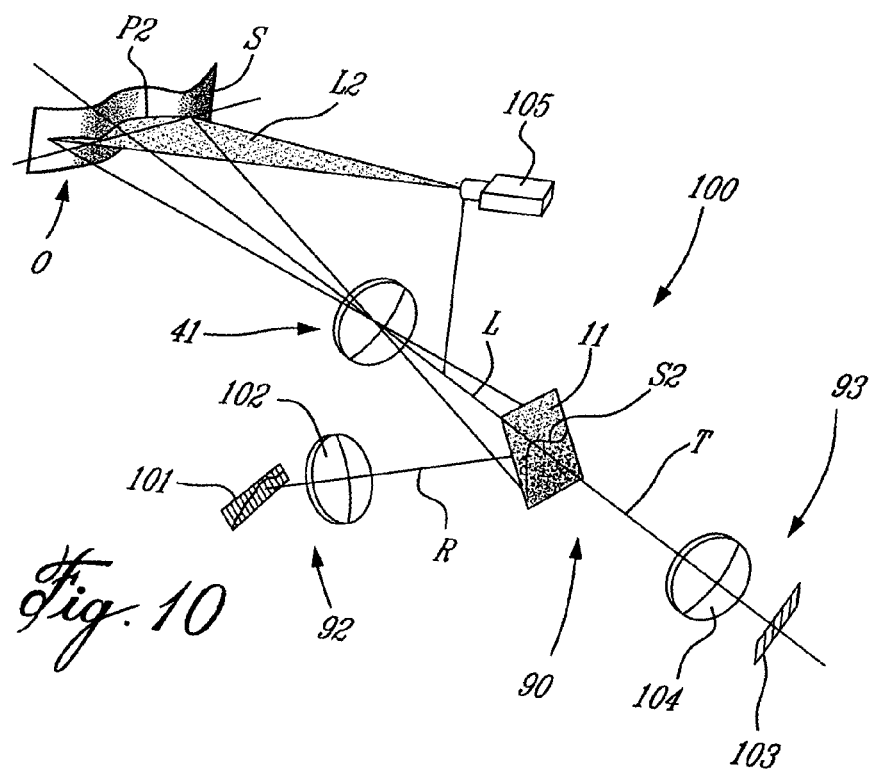
FIG. 10 is a perspective view of a 3-D profilometer in accordance with the present invention.

The position-sensing devices 10 of FIGS. 1 to 7 have been used in apparatuses for single-point positioning, i.e., providing a single value, the distance Z between the spot of light P1 and the respective position-sensing apparatuses. However, position-sensing devices using beam splitters 11 can also be used to obtain the position of light profiles. Referring to FIG. 9, a position-sensing device 90 for a multipoint position-sensing apparatus is shown having the beam splitter 11 with the surface pattern 20A. A reflective photodetector section 92 receives the reflective channel R, whereas a transmission photoelectric section 93 receives the transmission channel T. The spot of light on the beam splitter 11 is a linear profile S2. The reflective photodetector section 92 and the transmission photodetector section 93 each have a multielement linear photodetector array, and each element of the array is associated with a lateral strip, one of which is schematically illustrated at 94, of the beam splitter 11. Referring to FIG. 10, the surface S of the object O is not illuminated by a round spot of light, but rather by a thin sheet of light L2 from a light source, such as laser 105. The thin sheet of light L2 produces a curvilinear luminous line P2 on the observed surface S. The position-sensing device 90 is combined with the optical system 41 to form a multipoint position-sensing apparatus 100. The reflective photodetector section 92 has a multielement linear photodetector array 101 and a collecting lens 102 (or any equivalent group of lenses), whereas the transmission photodetector section 93 has a multielement linear array 103 and a collecting lens 104 (or any equivalent group of lenses). For the apparatus 100, because of the multipoint architecture, only the variable reflectivity-type beam splitter 11, i.e., with the surface pattern 20A (FIG. 2A), can be used. The arrays 101 and 103 are bars made up of a plurality of photoelectric detectors having a rectangular shape with a large aspect ratio.

Referring to FIG. 10, the collecting lenses 102 and 103 make the image spot S2 of the beam splitter 11 on their respective photodetector arrays 101 and 103. The arrays 101 and 103 are tilted according to the Scheimpflug condition. As in the case of the single-point position-sensing device 10, the reflective channel R is identical to the transmission channel T. For each channel, the collecting lens 102 or 104 associates a distinct strip (not shown) of the beam splitter 11 with each photodetector element of the respective array 101 or 104. The luminous line of the spot S2 is virtually segmented into small portions by the strips (not shown) defined on the beam splitter 11 by the photodetectors. The portion of the luminous line of the spot S2 illuminating a given strip of the beam splitter 11 is partially transmitted towards the array 103 of the transmission channel T and partially reflected on the array 101 of the reflection channel R. Each photodetector element of the array 101 is associated with a photodetector element of the array 103, whereby C can be calculated with the light intensity detected by pairs of elements to give the Z distance. The pairs are related to an X distance, thereby providing a second dimension to each Z distance obtained, whereby linear profiles are detected by the apparatus 100. The third dimension, i.e., Y distance, is obtained to gather 3-D profiles by the known relative displacement of the object with respect to the apparatus 100. It is pointed out that the apparatus 100 combined with a light source, e.g., laser 105, consists of a 3-D profilometer.

Cylindrical lenses (not shown) can be used in the collecting lenses 102 and/or 104 to produce an anamorphic magnification. These anamorphic objectives are useful in order to produce an image with a contraction factor according to the perpendicular with the axis of their respective photodetector arrays 101 and 103 This allows the use of photodetector arrays with aspect ratios of the individual detectors (pixels) that can be smaller than those that would normally be necessary if a non-anamorphic imaging lens were used.

Figure 11:
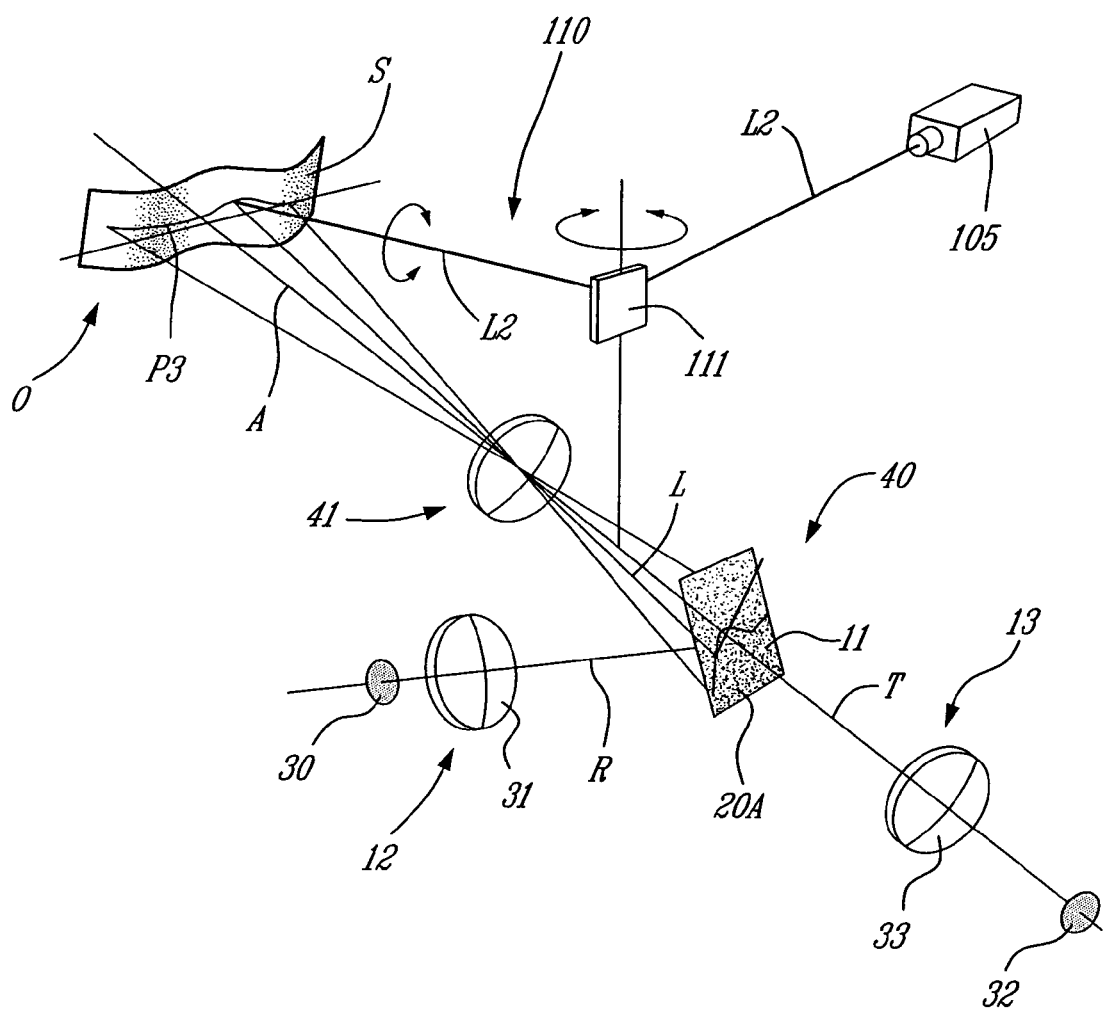
FIG. 11 is a 3-D scanning apparatus in accordance with the present invention.

Referring to FIG. 11, a 3-D scanning apparatus in accordance with the present invention is shown at 110. The 3-D scanning apparatus 110 incorporates a position-sensing apparatus 40 as illustrated in FIG. 4. However, the sheet of light L2 is generated by a laser beam of the laser 105 combined with a scanning mirror 111. The profile of the observed surface S is scanned point by point and the image of the moving spot P3 is produced by the optical system 41 on the beam splitter 11 having the surface pattern 20A. Since the surface S is sampled one point at the time, there is no need to use photodetector arrays. The light T transmitted by the beam splitter 11 is thus collected on the single-element photodetector 32 by means of its collecting lens 33. The reflected light R is also simultaneously collected on the single-element photodetector 30 using its collecting lens 31. The raw data are interpreted in the same way as in the case of the single-point position-sensing apparatus 40, i.e., by calculating C. The synchronous acquisition of the photodetector's signals, together with the angular position of the scanning mirror 111, allows the mapping of the 3-D profile scanned by the laser beam 12. This approach is a low-cost alternative to other 3-D scanning devices. It involves no mobile parts except for the scanning mirror 111.

I claim:

1. A device for sensing position data of a light pattern created by a known light source on an object, comprising:
   an optical system for collecting an incident light beam from the light pattern and for transmitting the incident light beam to a beam splitter as an elongated light beam;
   the beam splitter having a surface of a known reflection/transmission ratio, such that the elongated light beam received on the surface of the beam splitter results in at least one of a transmission channel, transmitted through the splitter, and a reflective channel, reflected from the beam splitter with intensities of the transmission channel and the reflective channel varying as a function of a position of the incident light beam along one dimension of the surface of the beam splitter, the reflection/transmission ratio of the surface being provided by a transmission-only portion of the surface and a reflection-only portion of the surface, the two portions being separated by a boundary such that the elongated light beam is distributed on both said portions, said boundary being at an angle with respect to a longitudinal dimension of the elongated light beam so as to create the variable reflection/transmission of the elongated light beam as a function of the position of the light beam along the dimension of the beam splitter;
   a first photodetector section adapted to detect the intensity of the reflective channel; and
   a second photodetector section adapted to detect the intensity of the transmission channel;
   wherein at least a first dimension of at least one point of the light pattern on the object is calculable as a function of the intensity of the reflective channel and of the intensity of the transmission channel.

2. The device according to claim 1, wherein the first and the second photodetector section each consist of at least one collecting lens and a single-element photodetector.

3. The device according to claim 2, wherein the first dimension is a distance between the light pattern and the device.

4. The device according to claim 1, wherein the known reflection/transmission ratio varies non-linearly along said one dimension, an operating range of the device being associated with highest variations in the known reflection/transmission ratio of the beam splitter.

5. An apparatus for sensing position data of a light pattern created by a known light source on an object, comprising:
   an optical system for collecting an incident light beam from the light pattern and transmitting the incident light beam to at least two beam splitter, each one of the beam splitters for receiving a portion of the incident light beam;
   each one of the beam splitter having a surface of a known reflection/transmission ratio, such that the portion of the incident light beam received on the surface of the beam splitter results in at least one of a transmission channel, transmitted through the beam splitter, and a reflective channel, reflected from the beam splitter, with intensities of the transmission channel and the reflective channel varying as a function of a position of the incident light beam on the surface of the beam splitter;
   a first detector section for each one of the beam splitters adapted to detect the intensity of the reflective channel; and,
   a second detector section for each one of the beam splitters adapted to detect the intensity of the transmission channel;
   wherein at least a first dimension of at least one point of the light pattern on the object is calculable as a function of the intensity of the reflective channel of each one of the first detection sections and of the intensity of the transmission channel of each one of the second detection sections.

6. The apparatus according to claim 5, wherein the first and the second photodetector section each consist of at least one collecting lens and a single-element photodetector.

7. The apparatus according to claim 6, wherein the first dimension is a distance between the light pattern and the device.

8. The apparatus according to claim 7, further comprising a displaceable mirror adapted to reflect an illumination beam from the known light source to the surface to create the light pattern, a displacement rate of the displaceable mirror being known such that a second dimension of points of the light pattern is calculable.

9. The apparatus according to claim 8, further comprising the light source.

10. The apparatus according to claim 9, wherein a relative displacement between the object and the apparatus is known such that a third dimension is calculable to provide a three-dimensional profile of the object.

11. The apparatus according to claim 5, wherein the first and the second photodetector sections each consist of linear multi-element photodetector arrays, a second dimension being calculable as a function of a position of the reflective channel and the transmission channel on respective ones of the linear multi-element photodetector arrays, such that the light pattern can be a linear profile.

12. The apparatus according to claim 11, wherein a relative displacement between the object and the apparatus is known such that a third dimension is calculable to provide a three-dimensional profile of the object.

13. The apparatus according to claim 12, further comprising the light source to create the light pattern on the object.

14. The apparatus according to claim 5, wherein the number of beam splitters is three, with a first one of the beam splitters having a surface with a respective known reflection/transmission ratio varying along one dimension of the surface of the first one of the beam splitters, a second one of the beam splitters having a surface with a respective known reflection/transmission consisting of an alternating pattern of first and second cells, with said first cells being limited to transmission of light, and said second cells each having a reflection/transmission ratio varying linearly along one dimension of the surface of the second one of the beam splitters, and a third one of the beam splitters having said alternating pattern of the second one of the second beam splitters, with said alternating pattern of the second one of the beam splitters and said alternating pattern of the third one of the beam splitters being out of phase with respect to one another, with an operating range of the second one and the third one of the beam splitters being complementary such that said at least a first dimension is calculated as a function of the intensities of the reflective channel and the transmission channel created by one of the second and third one of the beam splitters and validated by an intensity of the reflective channel and the transmission channel of the first one of the beam splitters.

* * * * *